(12) United States Patent
Lu et al.

(10) Patent No.: US 10,552,874 B2
(45) Date of Patent: Feb. 4, 2020

(54) PROMPTING A USER TO PURCHASE ITEMS FOR USE IN AN APPLICATION IN A FEED OF CONTENT PROVIDED BY AN ONLINE SYSTEM

(71) Applicant: Facebook, Inc., Menlo Park, CA (US)

(72) Inventors: Pin Lu, Kirkland, WA (US); Derek Chirk Yin Cheng, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 653 days.

(21) Appl. No.: 14/576,150

(22) Filed: Dec. 18, 2014

(65) Prior Publication Data

US 2016/0180398 A1 Jun. 23, 2016

(51) Int. Cl.
*G06Q 30/02* (2012.01)
*G06Q 30/06* (2012.01)

(52) U.S. Cl.
CPC ..... *G06Q 30/0269* (2013.01); *G06Q 30/0601* (2013.01)

(58) Field of Classification Search
CPC ................ G06Q 30/0269; G06Q 30/0601
USPC ...................................................... 705/14.71
See application file for complete search history.

(56) References Cited

U.S. PATENT DOCUMENTS

| | | | | |
|---|---|---|---|---|
| 2012/0109757 A1* | 5/2012 | Kendall | ................ | G06Q 30/02 705/14.71 |
| 2013/0290149 A1* | 10/2013 | Rashwan | ........... | G06Q 30/0641 705/27.1 |
| 2014/0129942 A1* | 5/2014 | Rathod | ............ | H04N 21/44222 715/720 |

OTHER PUBLICATIONS

"What Influences People to Purchase InGame Mobile Items?: Analysis of Motivational Drivers to Use InGame Mobile Game Items in the U.S.", by Donghui Cho. Thesis Submission to Michigan State University. 2015. pp. 5 and 8. (Year: 2015).*

* cited by examiner

*Primary Examiner* — William A Brandenburg
(74) *Attorney, Agent, or Firm* — Fenwick & West LLP

(57) ABSTRACT

An online system receives an advertisement ("ad") request identifying an application, one or more items for use within the application, ad content, and a prompt for purchasing one or more of the items. The prompt for purchasing an item comprises text or image data describing the purchasing and instructions that, when executed by a client device, request payment information from a user accessing the prompt. When the ad content is presented to a user, the prompt is also presented. When the user interacts with the prompt, payment information is requested and communicated to a third party system associated with the application. The ad content and prompt may be presented to the user within a feed of content items provided to the user by the online system.

10 Claims, 3 Drawing Sheets

PROMPTING A USER TO PURCHASE ITEMS FOR USE IN AN APPLICATION IN A FEED OF CONTENT PROVIDED BY AN ONLINE SYSTEM

BACKGROUND

This disclosure relates generally to presentation of content by an online system, and more specifically to presenting content allowing a user to purchase an item within an application.

An online system, such as a social networking system, allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for entities, such as retailers or service providers, to increase awareness about products or services by presenting content to online system users.

Presenting content items to online system users allows an entity (e.g., a retailer, a service provider, a restaurant) to gain public attention for products or services or to persuade online users to take an action regarding the entity's products or services. Additionally, many online systems generate revenue by receiving compensation from entities for presenting certain content items to their users. Frequently, online systems charge an entity for each presentation of certain types of content items to an online system user (e.g., each "impression" of the content item) or for each interaction with certain types of content items by an online system user.

Additionally, users may interact with applications via the online system or applications that exchange information with the online system. For example, a user interacts with a game application or a music streaming application to interact with additional content than content provided by the online system. Many applications allow users to purchase or acquire items for use within the application to increase the functionality of the application to the user. However, conventional applications require a user to purchase items by directly interacting with the application, which reduces user interaction with the online system and may increase the time for a user to purchase an item for use in the application.

SUMMARY

An online system receives an advertisement ("ad") request identifying an application and one or more items for use within the application. Additionally, the ad request includes targeting criteria, ad content, and a prompt for purchasing one or more of the items. For example, the application allows a user to perform additional features in exchange for the user redeeming virtual currency through the application, and the ad request identifies an amount of virtual currency; thus, the ad request also includes a prompt for purchasing the amount of virtual currency. The prompt for purchasing a product comprises text or image data describing the purchasing and instructions that, when executed by a client device, request payment information from a user accessing the prompt. Hence, by interacting with the prompt, the user may purchase the item identified by the ad request, which allows the user to more easily obtain the item for subsequent use when interacting with the application.

In some embodiments, the online system maintains objects identifying various items for use within an application. An object identifying an item includes a description of the item and a price associated with the item that specifies an amount of compensation to a third party system associated with the application to purchase the item. Additionally, the object may identify one or more additional items related to the item or any other suitable information. The online system may also maintain an object identifying the application and a connection between the object identifying an item and the object identifying the application to specify the item is for use within the application. Hence, the ad request may include an identifier of the object associated with the application and identifiers of objects associated with the one or more items to identify the application and the one or more items.

Based at least in part on the targeting criteria included in the ad request, the online system identifies a user of the online system eligible to be presented with the ad content from the ad request. The identified user is associated with at least a threshold number of characteristics satisfying the targeting criteria included in the ad request. When selecting content for presentation to the identified user, the ad request is included in a selection process in which one or more content items are selected for presentation to the identified user. In various embodiments, the bid amount included in the ad request is used by the selection process when determining whether to present the ad content included in the ad request to the identified user.

If the ad request is selected for presentation to the user, the online system communicates the ad content, which includes the prompt to purchase the one or more items for use within the application, to a client device for presentation to the user so the prompt is presented to the user along with the ad content. When the user interacts with the prompt, payment information is requested from the user. For example, in response to receiving an interaction with the prompt, the online system communicates an interface requesting payment information to the client device for presentation to the user. The user may provide payment information via the interface or retrieve stored payment information maintained by the online system or by a third party system via the interface. If payment information is received via the interface, it may be communicated to the online system for communication to the third party system associated with the application or directly communicated to the third party system associated with the application. In some embodiments, content from the application is provided to the client device via the online system or via the third party system associated with the application after the third party system associated with the application receives the payment information.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
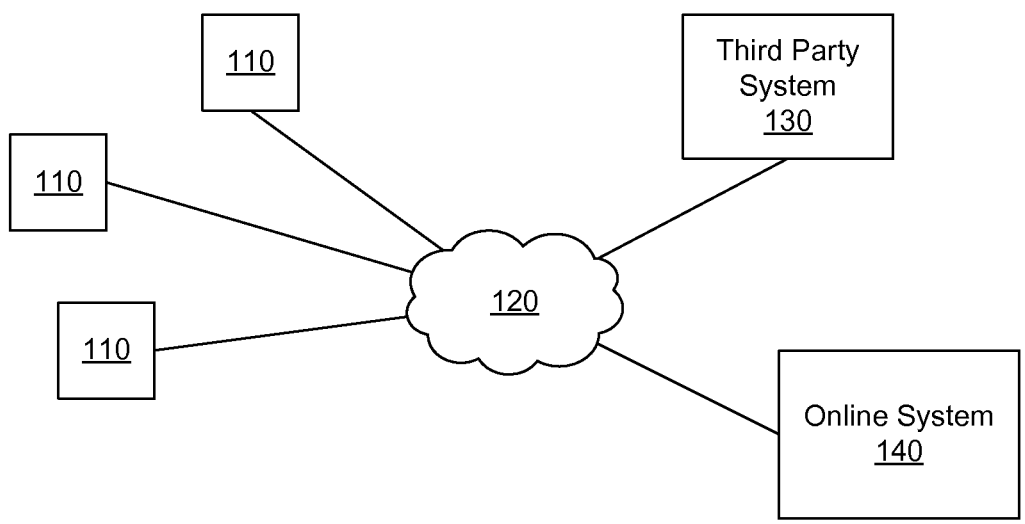
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems as well.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
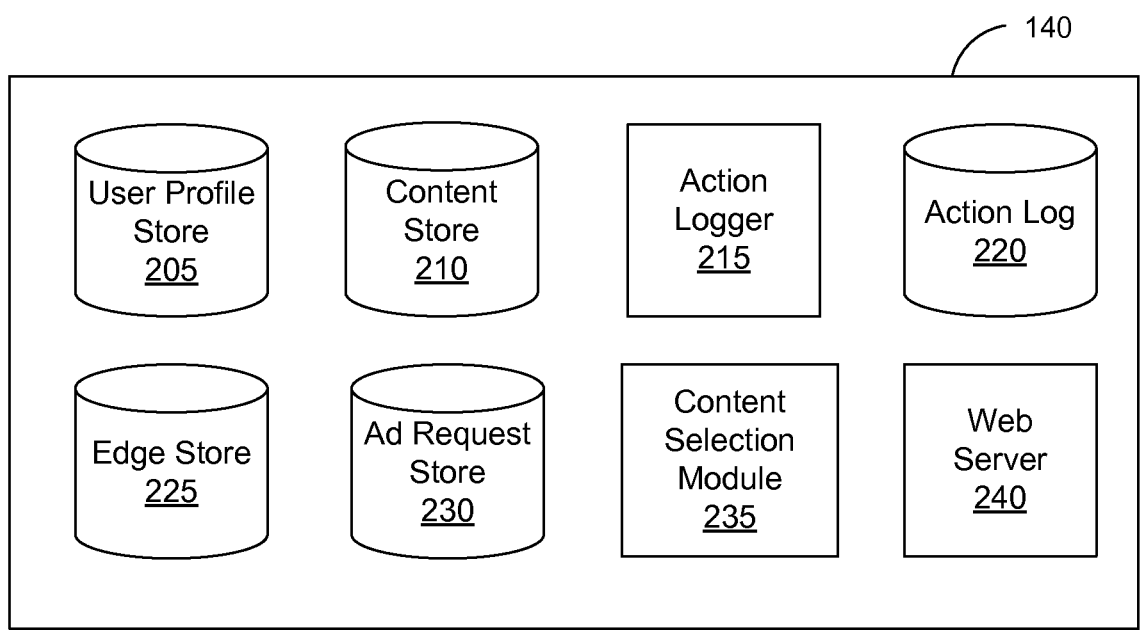
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture. In one embodiment, the online system 140 is a social networking system.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Certain objects in the content store 210 may be identified as associated with one or more applications. For example, an object associated with an application is an advertisement identifying the application. As another example, an object associated with a gaming application is a web page describing the gaming application. The web page may include a link for purchasing the gaming application, an image showing the gaming application, text describing installation or use of the gaming application, etc. Alternatively and additionally, an object related to an application may be group associated with the application and including one or more users of the online system 140. As another example, an object identifies an item for use within the application as well as a price specifying an amount of compensation to a third party system 130 associated with the application to allow a user to use the item when interacting with the application. For example, an object identifies a virtual currency spent within an application to provide a user with additional features as well as an amount of actual currency provided to a third party system 130 associated with the application to obtain the virtual currency. However, any other suitable type of object may be associated with an application and maintained in the content store 210. For example, content posted to the online system 140 identifying an application or relating to the application is identified as associated with the application or an invitation related to the application are identified as associated with the application. In various embodiments, an application identifier specifying an application is associated with an object associated with the application to allow the online system 140 to identify objects associated with the application.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement ("ad") requests are included in the ad store 230. An ad request is received from an advertiser for presentation to users of the online system 140 and the ad request may be included in an advertisement campaign ("ad campaign") by the advertiser. Each ad request includes advertisement content ("ad content"), which is ad content presented to an online system user. Ad content may be text data, image data, audio data, video data, or any other suitable data. Additionally, ad content may include a link or destination address associated with a source of content associated with the ad request that is presented to the user if the user accesses the ad content when it is presented. For example, the destination address identifies a landing page including content that is presented to the user when the user accesses the ad content. Ad content may also include one or more prompts for performing an action that comprise information identifying the action and instructions that, when executed, perform the action. A prompt for purchasing a product comprises text or image data describing the purchasing and instructions that, when executed, request payment information from a user accessing the prompt. As further described below in conjunction with FIG. 3, ad content included in an ad request may include a prompt for purchasing an item for use within an application that requests payment information from the user when an interaction with the prompt is received, allowing the user to purchase the item by interacting with the prompt.

Additionally, an ad request include a bid amount specifying an amount of compensation an advertiser associated with the ad request provides the online system 140 for presenting the ad content, for a user interacting with presented ad content, or for another suitable interaction with presented ad content by a user. Based on the bid amount included in an ad request, the online system 140 determines an expected value for presenting ad content in the ad request to a user. For example, the expected value is an amount of monetary compensation received by the online system 140 from an advertiser for presenting the advertisement to a user, for a user interacting with the presented ad content, or based on any other suitable condition. In one embodiment, the expected value of an ad request is a product of the bid amount and a probability of the ad content of the ad request being accessed by the user if presented.

A bid amount associated with an ad request may be based on a type associated with the ad request. The type associated with an ad request may be based at least in part on the format with which ad content included in the ad request is displayed or the type of information presented by the ad content. For example, a type of ad request includes ad content describing a single product or service. Another type of ad request includes ad content describing multiple products or services. Another type of ad request may include multiple components of ad content and an order in which the various components are presented to a user. As another example, an ad request may include one or more prompts for performing an action that are presented along with ad content, such as video data, to encourage to perform actions identified by the one or more prompts; a prompt for performing an action includes information identifying an action and instructions that, when executed, perform the identified action. A bid amount associated with an ad request may be proportional to the amount of different content included in the ad content. For example, a higher bid amount is associated with an ad request including ad content describing multiple products or services than is associated with an ad request including ad content describing a single product or service.

Additionally, ad requests may be associated with one or more targeting criteria. An advertiser may specify targeting criteria associated with an ad request or may specify targeting criteria associated with multiple ad requests included in an ad campaign. Targeting criteria specify one or more characteristics of users eligible to be presented with an ad content included in an ad request associated with the targeting criteria. Associating different targeting criteria with different ad requests allows an advertiser to tailor presentation of ad content to users having specific characteristics, allowing ad requests including different ad content to be presented to users with different characteristics. For example targeting criteria specify demographic information, connections, or actions associated with a user. In some embodiments, targeting criteria may be associated with an ad campaign in its entirety, so multiple ad requests in the ad campaign are associated with the targeting criteria.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with ad content from various ad requests. As another example, targeting criteria identifies users having a connection to another user or object or having a particular type of connection to another user or object.

Additionally, an ad request may include an objective specifying a goal of the advertiser for presentation of the ad content in the ad request to online system users. The objective may also be associated with an ad campaign including the ad request to specify a goal of the advertiser for other ad requests in the ad campaign as well as the ad request. For example, the objective identifies a type of interaction with ad content from ad requests included in the ad campaign or with one or more objects associated with ad requests in the ad campaign by online system users presented with ad content from the ad campaign. Examples of objectives include: online system users accessing presented ad content (e.g., clicking or otherwise accessing the advertisement), online system users installing an application associated with the ad content, online system users expressing a preference for a page associated with the ad content (i.e., "liking" the page), online system users viewing a page associated with the ad content or with the ad campaign, or any other suitable action by online system users. In one embodiment, the objective is selected from a set of objectives maintained by the online system 140.

Additional information may be associated with an ad request or with the ad campaign including the ad request. For example, the ad request or ad campaign includes a budget that specifies a total amount of compensation an advertiser provides the online system 140 for presenting ad content included in the ad request or included in ad requests associated with an ad campaign. The budget may be allocated for the ad campaign as a whole or per ad request. In addition, the advertiser may specify instructions for allocating the budget among various ad requests in the ad campaign. For example, the instructions specify modification of a bid amount associated with an ad request included in the ad campaign based on one or more criteria. The instructions may also include other suitable information describing allocation of a budget among ad requests included in the ad campaign.

The content selection module 235 selects one or more content items for communication to a client device 110 to be presented to a viewing user. Content items eligible for presentation to the viewing user are retrieved from the content store 210, or from another source, by the content selection module 235, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 235 includes content items eligible for presentation to the viewing user in one or more selection processes, which identify a set of content items for presentation to the viewing user. For example, the content selection module 235 determines a measure of relevance of various content items to the user based on characteristics associated with the user by the social networking system 140 based on the user's affinity for different content items and selects content items for presentation to the user based on the determined measures of relevance. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with various content items when selecting content for presentation to the viewing user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the social networking system 140 for presenting a content item. For example, the expected value associated with an ad request is a product of the ad request's bid amount and a likelihood of the user interacting with the ad content from the ad request. The content selection module 235 may rank ad requests based on their associated expected values and select ad requests having at least a threshold position in the ranking for presentation to the user. In some embodiments, the content selection module 235 may rank both content items and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

In various embodiments, the content selection module 235 presents content to a user through a feed including multiple content items. For example, the feed includes content items describing actions performed by users of the online system 140 as well as ad content from one or more ad requests selected for presentation to a user. The content selection module 235 may also determine the order in which selected content items or advertisements are presented via the feed. For example, the content selection module 235 orders content items or advertisements in the feed based on likelihoods of the user interacting with various content items or ad requests.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
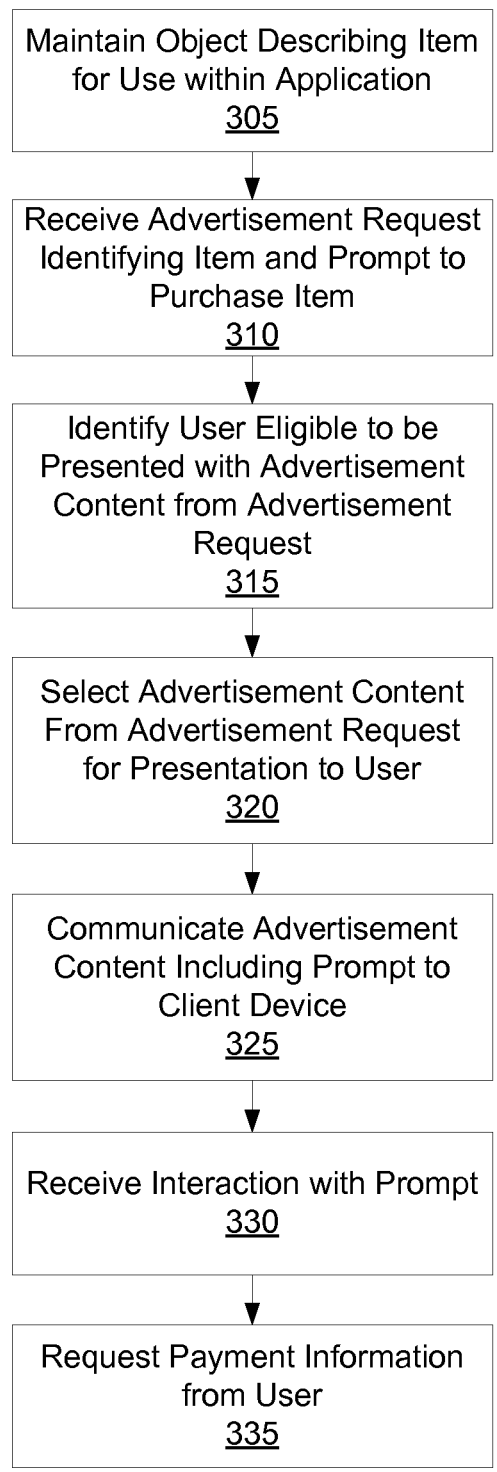
FIG. 3 is a flowchart of a method for presenting advertisement content allowing a user of an online system to purchase an item for use in an application, in accordance with an embodiment.

Presenting Ad Content Allowing Purchase of Items for Use in an Application via the Ad Content FIG. 3 is a flowchart of one embodiment of a method for presenting advertisement content allowing a user of an online system 140 to purchase an item for use within an application. In other embodiments, the method may include different and/or additional steps than those shown in FIG. 3. Additionally, steps of the method may be performed in different orders than the order described in conjunction with FIG. 3.

The online system 140 maintains 305 an object describing an item for use when a user interacts with an application. Various applications allow users to obtain items that are associated with the user by the application and may subsequently be retrieved and used by the user when interacting with the application. For example, a user acquires virtual currency associated with an application and subsequently obtains items or objects within the application by spending the virtual currency within the application. As another example, a user obtains one or more items associated with an application that provide the user with certain functionality when an item is used within the application (e.g., allowing the user to perform different actions within the application). To more easily allow a user to interact with an application via the online system 140, an object identifying the application may be maintained by the online system 140 along with one or more objects describing items capable of being used when a user interacts with an application. An object describing an item capable of being user within the application identifies the application in which the item may be used and includes information describing the item (e.g., a name, a description, an item identifier, identification of related items, etc.) as well as a price for purchasing the item. A connection between the object describing the item and the object identifying the application in which the item may be used may also be maintained by the online system 140, and connections between objects associated with various items capable of use when interacting with the application may also be maintained by the online system 140.

The online system 140 receives 310 an advertisement ("ad") request that identifies an application as well as an item for use when a user interacts with the application. For example, the ad request includes information identifying the application, such as an application identifier or an identifier of an object describing the application and maintained by the online system 140, as well as information identifying the item (e.g., an identifier of an object describing the item and maintained by the online system 140, an identifier associated with the item, etc.). Information identifying the item for use within the application also includes a price specifying an amount of compensation to provide to a third party system 130 associated with the application in exchange for the third party system 130 associating the item with a user profile associated with the user by third party system 130 for use with the application. Additionally, the ad request includes ad content, targeting criteria, and a prompt for purchasing the identified item. The prompt for purchasing the identified item includes information identifying an action and instructions that, when executed, prompt the user to provide payment information for the item and communicate received payment information to a third party system 130 associated with the application identified in the ad request. For example, a prompt for purchasing the identified item is associated with a network address associated with the identified application and instructions to present an interface to the user for providing payment information and to communicate payment information received via the interface to the network address.

Based on the targeting criteria included in the ad request and characteristics associated with online system users, the online system 140 identifies 315 a user of the online system 140 eligible to be presented with the ad content. For example, a user associated with at least a threshold number of characteristics satisfying the targeting criteria in the ad request is identified as eligible to be presented with the ad content from the ad request. Targeting criteria included in the ad request may identify one or more types of interactions with the application identified by the ad request, so a user who previously performed the one or more types of interactions is identified 315 as eligible to be presented with the ad content. For example, targeting criteria in the ad request specifies a threshold number of prior purchases via the application of one or more items for use within the application, so the user is identified 315 as eligible to be presented with the ad content if the online system 140 associates at least the threshold number of prior purchases of items for use within the application with the user. In the preceding example, the targeting criteria may additionally specify one or more specific items or types of items that were previously purchased or may specify a time interval in which the prior purchases were made (e.g., within a week of a current time). As another example, the targeting criteria specifies a threshold amount of interaction with the application without purchasing an item for use within the application through the application. The threshold amount of interaction may be specified as a length of time interacting with the application, a frequency of interaction with the application, a number of interactions with the application, or specified using any suitable format.

After identifying 315 the user as eligible to be presented with the ad content from the ad request, the online system 140 selects 320 the ad content from the ad request for presentation to the user. As described above in conjunction with FIG. 2, when selecting 320 content for presentation to the identified user, the ad request is included in a selection process in which one or more content items, which may include ad requests, are selected 320 for presentation to the identified user. In various embodiments, the bid amount included in the ad request is used in the selection process when determining whether to present the ad content included in the ad request to the identified user. For example, the online system 140 determines an expected value associated with the ad request based on its bid amount and a likelihood of the identified user interacting with the ad content. If the ad request is associated with at least a threshold expected value or has at least a threshold expected value, it is selected 320 for presentation. As another example, the online system 140 ranks ad requests based on their associated expected values, and if the ad request has at least a threshold position in the ranking, it is selected 320 for presentation.

The online system 140 communicates 325 the ad content, which includes the prompt for purchasing the item identified by the ad request, to a client device 110 for presentation to the user. The price associated with the item may be presented in the ad content or in the prompt for purchasing the item. In one embodiment, the online system 140 communicates a feed of content items including the ad content and other content items to the client device 110 for presentation. The feed of content items may include one or more content items describing actions associated with additional online system users connected to the user via the online system 140, so the ad content is presented along with content items describing actions of online system users. In another embodiment, the online system 140 allows its users to exchange messages with each other and presents a user with a thread including multiple messages exchanged between users. For example, the thread includes messages exchanged between the user and an additional user. Alternatively, the thread includes messages between the user and multiple additional users. An application associated with the online system 140 may execute on client devices 110 associated with various users; the application communicates messages received from a user to the online system 140 for presentation to one or more additional users via a thread and presents messages received from one or more other users to the user via the online system 140 to the user via a thread. The online system 140 may include one or more advertisements in a thread presented to a user along with messages for presentation to the user.

When the ad content is presented by the client device 110, the prompt for purchasing the item is presented to the user, allowing the user to purchase the item by accessing the prompt. In various embodiments, when the online system 140 receives 330 an interaction with the prompt included in the ad content, the online system 140 requests payment information from the user. For example, in response to receiving 330 an interaction with the prompt, the online system 140 communicates an interface requesting 335 payment information to the client device 110 for presentation to the use. The payment information identifies a price for the item specifying an amount of compensation from the user to a third party system 130 associated with the application (or to the online system 140) in exchange for the third party system 130 associating the item with a user profile for the application maintained by the third party system 130. In some embodiments, the online system 140 retrieves the interface from a third party system 130 associated with the application identified in the ad request and communicates the interface to the client device 110. The user may provide payment information via the interface or retrieve stored payment information maintained by the online system 140 or by a third party system 130 via the interface.

If payment information is received, the online system 140 may communicate the payment information the third party system 130 associated with the application. Alternatively, payment information received via the interface may be directly communicated from the client device 110 to the third party system 130 associated with the application without being communicated to the online system 140. When the third party system 130 associated with the application receives payment information from the user, the third party system 130 associated with the application associates the item with a user profile maintained by the third party system 130 for use with the application. Hence, the user may purchase items to enhance subsequent interaction with the application by interacting with the prompt presented with the ad content, allowing the user to purchase items for use with the application without navigating away from content provided to the user by the online system 140.

In some embodiments, after receiving payment information, the online system 140 retrieves content from the application and communicates the retrieved content to the client device 110 for presentation to the user. For example, the online system 140 communicates information identifying the user to the third party system 130 associated with the application and subsequently communicates information associated with the user (e.g., a user status within the application, items associated with the user by the application, etc.) by the third party system 130 to the client device 110 for presentation. As another example, the online system 140 communicates information to the third party system 130 identifying the user when payment information is received, and the third party system 130 communicates content from the application to the client device 110 for presentation to the user. If the online system 140 provides the application, the online system 140 retrieves content from the application associated with the user and communicate the content to the client device for presentation. Alternatively, the online system 140 includes a network address associated with the third party system 130 associated with the application in the interface requesting payment information and an instruction that, when executed, causes the client device 110 to retrieve information from the network address. When an interaction with the interface confirming or sending payment information is received, the instruction is executed, causing the client device 110 to retrieve and present content form the third party system 130 associated with the application.

Figure 4:
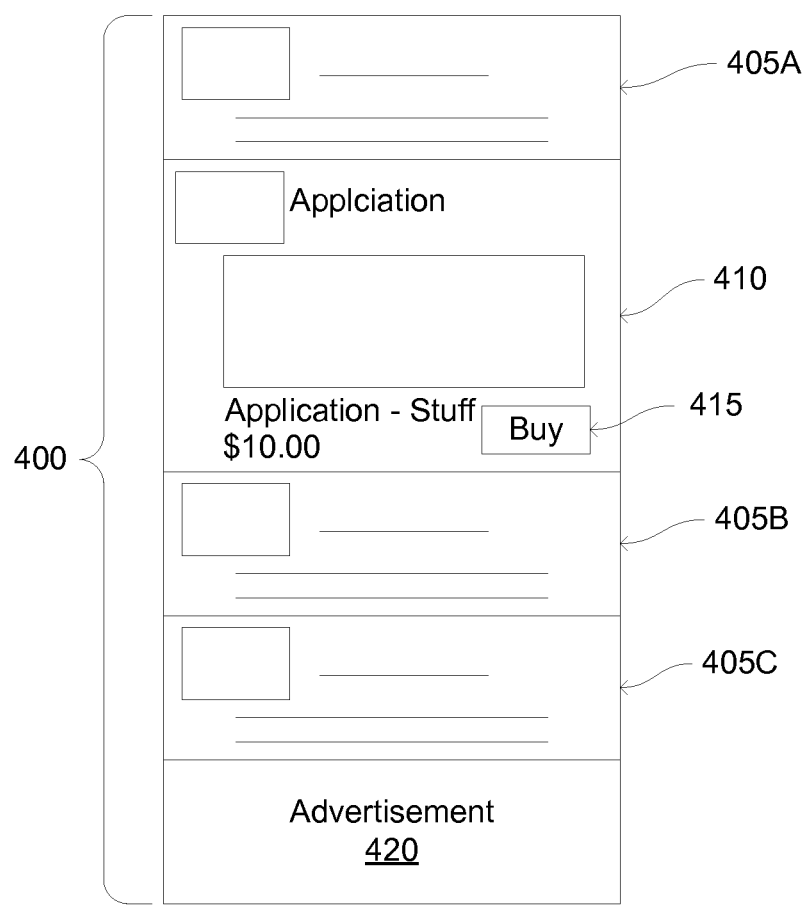
FIG. 4 shows an example of presenting advertisement content including a prompt to purchase an item for use with an application, in accordance with an embodiment.

Example Ad Content Including a Prompt to Purchase an Item for Use in an Application FIG. 4 is an example of ad content including a prompt for purchasing an item for use within an application. In the example of FIG. 4, a feed 400 of content items selected by the online system 140 for a user is presented to the user. The feed 400 includes content items 405A, 405B, 405C each describing an action performed by an additional user of the online system 140 connected to the user via the online system 140. Additionally, the feed 400 shown in FIG. 4 includes advertisements 410, 420, which are ad content included in different ad requests.

Advertisement 410 identifies an application and one or more items for use within the application. Additionally, advertisement 410 includes a prompt 415 for a user to purchase one or more of the items identified by advertisement 410. For example, advertisement 410 identifies virtual currency that may be used within the application to provide the user with additional functionality within the application. As another example, advertisement 410 identifies an item that, when used within the application, provide the user with increased functionality within the application (e.g., allows the user to access additional features of the application, expand functionality provided to the user by the application). Advertisement 410 also identifies a price associated with the item that specifies an amount of compensation to a third party system 130 associated with the application to allow the user to use the item when interacting with the application. When the user interacts with the prompt 415, the user is prompted to provide payment information to provide a third party system 130 associated with the application compensation in exchange for the third party system 130 associating the item identified by advertisement 410 with a user profile maintained by the third party system 130 for the user. Payment information from the user is provided to the third party system 130, which then associates the item identified by the advertisement with a user profile maintained by the third party system 130 and associated with the user. Hence, advertisement 410 allows the user to purchase items for use within the application without navigating away from the feed 400 of content items. This allows the user to enhance subsequent interaction with the application while accessing content provided by the online system 140, increasing interaction with the online system 140 as well as enhancing interaction with the application.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining, at a social networking system, an object describing an item for use within an online application, the object specifying a price for purchasing the item;
receiving, at the social networking system, an advertisement ("ad") request identifying the object maintained by the social networking system and including information identifying the online application, targeting criteria, and ad content including a prompt for purchasing the item for use within the online application described by the object, wherein the ad request specifies a threshold number of prior interactions with the application without having made a purchase of one or more items for use within the application;
retrieving, for a user of the social networking system, interactions with the application made by the user;
determining whether the retrieved interactions exceed the threshold number of prior interactions with the application specified by the ad request;
analyzing the retrieved interactions to determine whether the user has made a purchase of one or more items for use in the application;
responsive to the retrieved interactions exceed the threshold number of prior interactions without the user having made a purchase, identifying, by the social networking system, the user of the social networking system as being eligible to be presented with the ad content;
selecting, by the social networking system, the ad content from the ad request for presentation to the user;
communicating, by the social networking system, a feed of content to a client device for presentation to the user, the feed of content comprising:
the ad content including the prompt for purchasing the item, the prompt allowing the user to purchase the item directly from the feed of content without being navigated away from the feed of content; and
one or more content items, at least one of the content items describing an action associated with an additional user connected to the user via the social networking system;
receiving, by the social networking system, an interaction with the prompt for purchasing the item described by the object;
communicating, by the social networking system, an interface requesting payment information from the user to purchase the item described by the object in response to receiving the interaction with the prompt, the interface presented within the feed of content, thereby allowing the user to provide payment information through the interface without being navigated away from the feed of content;
receiving payment information from the user through the communicated interface;
communicating the received payment information to a third party system of the application, wherein communicating the received payment information to the third party system causes the item to be stored with a user profile of the application of the third party system in exchange for the received payment information; and
transmitting, by the social networking system, content of the application associated with the third party system to the client device for presentation to the user, the content of the application comprising an indication of the item stored with the user profile of the application for use in the application.

2. A method comprising:
receiving, at a social networking system, an advertisement ("ad") request including information identifying an online application, information identifying an item for use within the online application, targeting criteria, and ad content that includes a prompt for purchasing the item for use within the online application, wherein the ad request specifies a threshold number of prior interactions with the application without having made a purchase of one or more items for use within the application;
retrieving, for a user of the social networking system, interactions with the application made by the user;
determining whether the retrieved interactions exceed the threshold number of prior interactions with the application;
analyzing the retrieved interactions to determine whether the user has made a purchase of one or more items for use in the application;
responsive to the retrieved interactions exceed the threshold number of prior interactions without the user having made a purchase, identifying, by the social networking system, the user of the social networking system as being eligible to be presented with the ad content;
selecting, by the social networking system, the ad content from the ad request for presentation to the user;
communicating, by the social networking system, a feed of content to a client device for presentation to the user, the feed of content comprising the ad content including the prompt for purchasing the item for use within with the online application, the prompt allowing the user to purchase the item directly from the feed of content without being navigated away from the feed of content;
receiving, by the social networking system, an interaction with the prompt for purchasing item for use within the online application;

communicating, by the social networking system, an interface requesting payment information from the user to purchase the item for use within the online application in response to receiving the interaction with the prompt, the interface presented within the feed of content, thereby allowing the user to provide payment information through the interface without being navigated away from the feed of content;

receiving payment information from the user through the communicated interface;

communicating the received payment information to a third party system associated with the online application, wherein communicating the received payment information to the third party system causes the item to be stored with a user profile of the online application associated with the third party system in exchange for the received payment information; and transmitting, by the social networking system, content of the online application associated with the third party system to the client device for presentation to the user, the content of the online application comprising an indication of the item stored with the user profile of the application for use in the online application.

3. The method of claim 2, wherein the targeting criteria specifies users having at least a threshold amount of interaction with the application who have not purchased an item for use within the application via the application.

4. The method of claim 2, wherein the information identifying the item for use within the application comprises an identifier of an object maintained by the social networking system, the object describing the item.

5. A computer program product comprising a computer readable storage medium having instructions encoded thereon that, when executed by a processor, cause the processor to:

receive, at a social networking system, an advertisement ("ad") request including information identifying an online application, information identifying an item for use within the online application, targeting criteria, and ad content that includes a prompt for purchasing the item for use within the online application, wherein the ad request specifies a threshold number of prior interactions with the application without having made a purchase of one or more items for use within the application;

retrieve, for a user of the social networking system, interactions with the application made by the user;

determine whether the retrieved interactions exceed the threshold number of prior interactions with the application;

analyze the retrieved interactions to determine whether the user has made a purchase of one or more items for use in the application;

responsive to the retrieved interactions exceed the threshold number of prior interactions without the user having made a purchase, identify, by the social networking system, the user of the social networking system eligible to be presented with the ad content;

select, by the social networking system, the ad content from the ad request for presentation to the user;

communicate, by the social networking system, a feed of content to a client device for presentation to the user, the feed of content comprising the ad content including the prompt for purchasing the item for use within the application, the prompt allowing the user to purchase the item directly from the feed of content without being navigated away from the feed of content;

receive, by the social networking system, an interaction with the prompt for purchasing the item for use within the online application;

communicate, by the social networking system, an interface requesting payment information from the user to purchase the item for use within the application in response to receiving the interaction with the prompt, the interface presented within the feed of content, thereby allowing the user to provide payment information through the interface without being navigated away from the feed of content;

receive payment information from the user through the communicated interface;

communicate the received payment information to a third party system associated with the application, wherein communicating the received payment information to the third party system causes the item to be stored with a user profile of the online application associated with the third party system in exchange for the received payment information; and transmit, by the social networking system, content of the online application associated with the third party system to the client device for presentation to the user, the content of the online application comprising an indication of the item stored with the user profile of the application for use in the online application.

6. The method of claim 1, wherein the item for use within the application is virtual currency and wherein the ad content included in the communicated feed of content further comprises an identification of a quantity of the virtual currency.

7. The method of claim 2, wherein the item for use within the application includes virtual currency and wherein the ad content included in the communicated feed of content further comprises an identification of a quantity of the virtual currency.

8. The computer program product of claim 5, wherein the item for use within the application includes virtual currency and wherein the ad content included in the communicated feed of content further comprises an identification of a quantity of the virtual currency.

9. The method of claim 1, wherein prior to communicating, by the social networking system, the interface requesting payment information from the user to purchase the item, retrieving the interface from the third party system.

10. The method of claim 1, wherein communicating the received payment information to the third party system further comprises communicating information identifying the user to the third party system.

* * * * *